(12) United States Patent
Williams

(10) Patent No.: US 8,092,009 B2
(45) Date of Patent: Jan. 10, 2012

(54) EYEWEAR RETENTION DEVICE

(76) Inventor: Ronald Williams, Birmingham, AL (US)

( * ) Notice: Subject to any disclaimer, the term of this patent is extended or adjusted under 35 U.S.C. 154(b) by 0 days.

(21) Appl. No.: 12/640,872

(22) Filed: Dec. 17, 2009

(65) Prior Publication Data

US 2010/0283961 A1   Nov. 11, 2010

Related U.S. Application Data

(63) Continuation of application No. 29/336,727, filed on May 7, 2009, now abandoned.

(51) Int. Cl.
*G02C 3/00* (2006.01)
(52) U.S. Cl. ........................ 351/156; 351/157
(58) Field of Classification Search ............ 351/41, 351/156, 157, 158; D16/339
See application file for complete search history.

(56) References Cited

U.S. PATENT DOCUMENTS

| | | | |
|---|---|---|---|
| 1,819,738 A * | 8/1931 | Daniels | 351/156 |
| 2,704,961 A | 3/1955 | Weil | |
| 4,133,604 A | 1/1979 | Fuller | |
| 5,092,668 A | 3/1992 | Welch | |
| 5,575,042 A | 11/1996 | Kalbach | |
| 6,644,808 B1 | 11/2003 | Liu | |
| 6,941,619 B2 | 9/2005 | MacKay | |
| 7,284,855 B2 | 10/2007 | Bent | |
| 7,467,867 B1 | 12/2008 | Williams | |
| 2007/0046889 A1 * | 3/2007 | Miller et al. | 351/62 |

OTHER PUBLICATIONS

First Package Jul. 2008.
Yellow Mannequin Jul. 2008.
Product Flyer Jul. 2008.
Second Package Dec. 2008.
Jan. 2009 Show Literature.
First Brochure Apr. 2009.
Third Package Apr. 2009.

* cited by examiner

*Primary Examiner* — Huy K Mai
(74) *Attorney, Agent, or Firm* — Bradley Arant Boult Cummings LLP

(57) ABSTRACT

An eyewear retention device with a cable having sufficient strength so that, when worn on eyeglasses over the ears, the cable is suspended in an arc above the wearer's neck, shoulders or garments.

2 Claims, 5 Drawing Sheets

FIG. 1
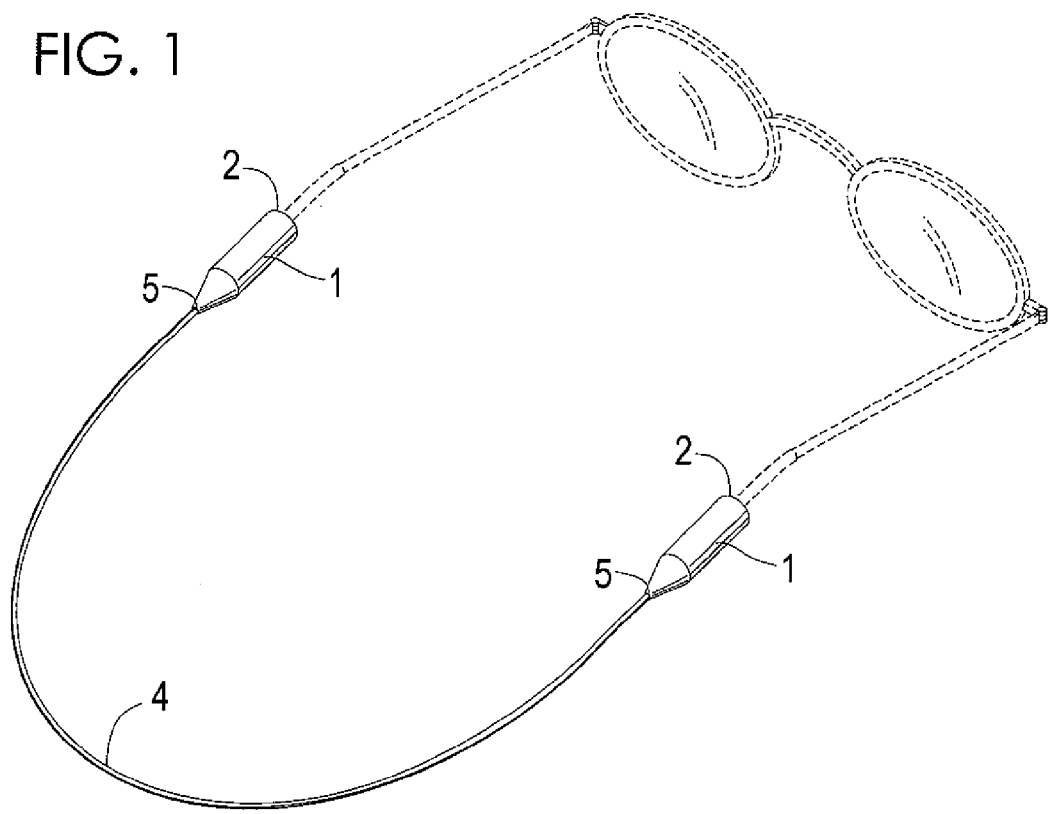
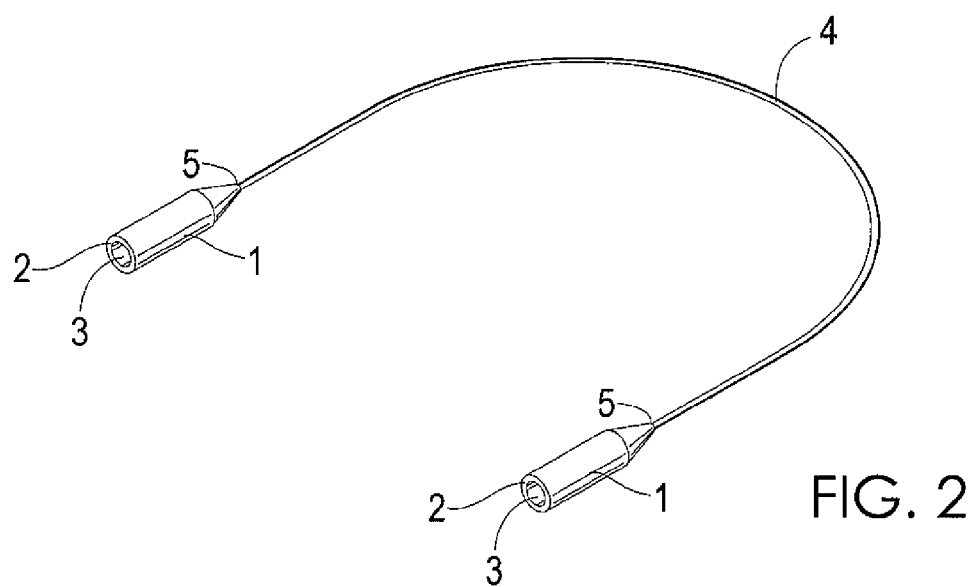
FIG. 2

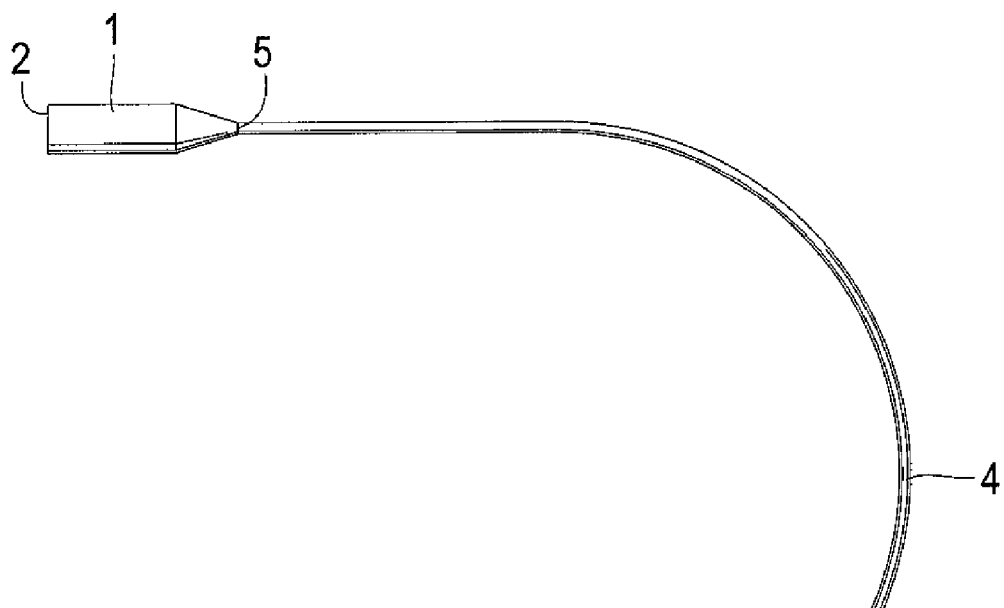
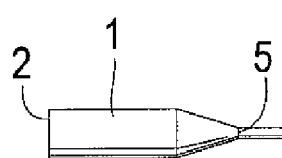
FIG. 3
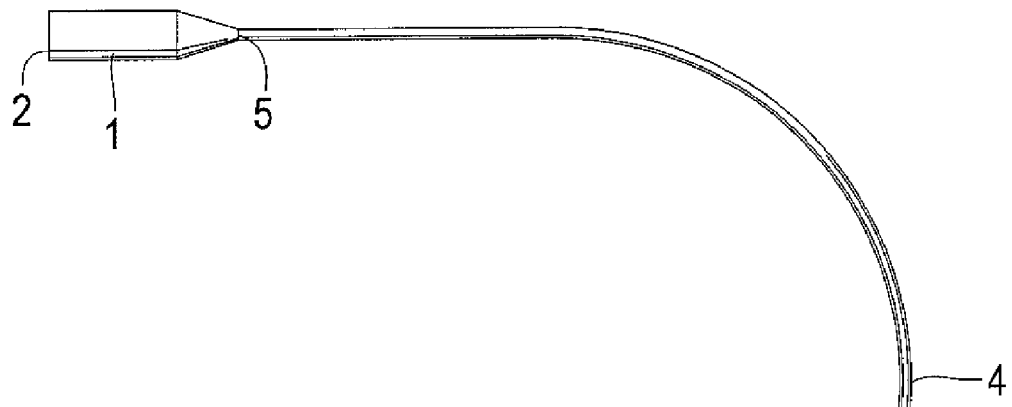
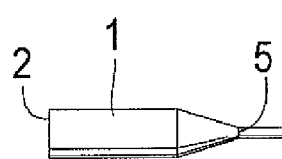
FIG. 4

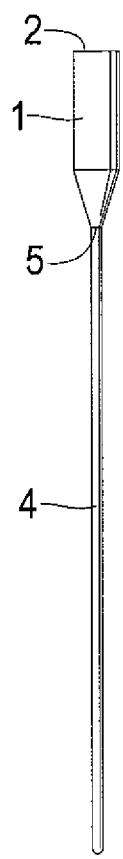
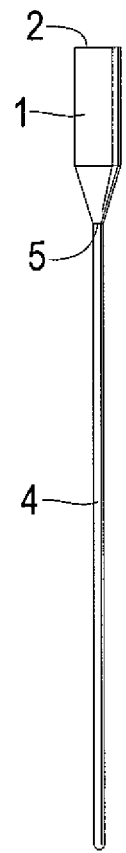
FIG. 5  FIG. 6
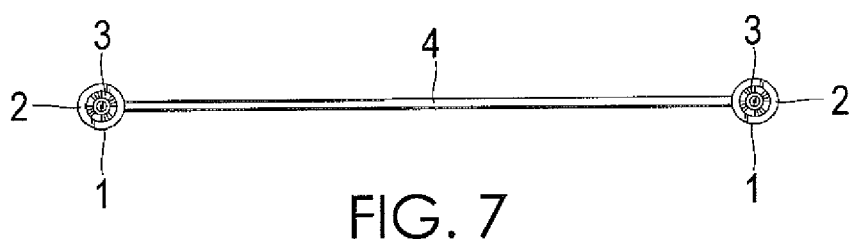
FIG. 7
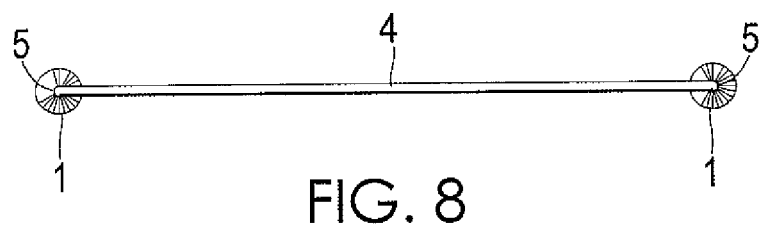
FIG. 8

EYEWEAR RETENTION DEVICE

This application claims priority to and the benefit of U.S. patent application Ser. No. 12/991,668, filed Nov. 8, 2010, which is a national stage entry of PCT Application No. PCT/US09/43156 filed May 7, 2009, which is a continuation of U.S. application Ser. No. 12/142,323, filed Jun. 19, 2008 (now U.S. Pat. No. 7,467,867), which claims priority to U.S. Provisional Application No. 61/051,539, filed May 8, 2008.

This is a utility continuation of U.S. design patent application number 29/336,727 filed May 7, 2009 now abandoned.

FIELD OF THE INVENTION

The field of the invention is eyewear retention devices.

SUMMARY OF THE INVENTION

The present invention is an eyewear retention device with two temple retainers, one each for fitting tightly over the end of an eyeglass temple, and a cable connecting each temple retainer to the other. When the invention is attached to eyeglasses and the eyeglasses are worn by a wearer over the ears, the cable is suspended in an arc above the wearer's neck, shoulders or garments.

BRIEF DESCRIPTION OF THE FIGURES

FIG. 1 is a rear perspective view.
FIG. 2 is a front perspective view.
FIG. 3 is a top plan view.
FIG. 4 is a bottom view.
FIG. 5 is a left side elevational view.
FIG. 6 is a right side elevational view.
FIG. 7 is a front elevational view.
FIG. 8 is a rear elevational view.

DETAILED DESCRIPTION

The present invention is an eyewear retainer device comprising two temple retainers 1, one each capable of being secured to the end of an eyeglass temple. The temple retainers are connected by a cable 4. The temple retainers can be formed in any shape and each has an opening for receiving the end of an eyeglass temple.

Figure 9:
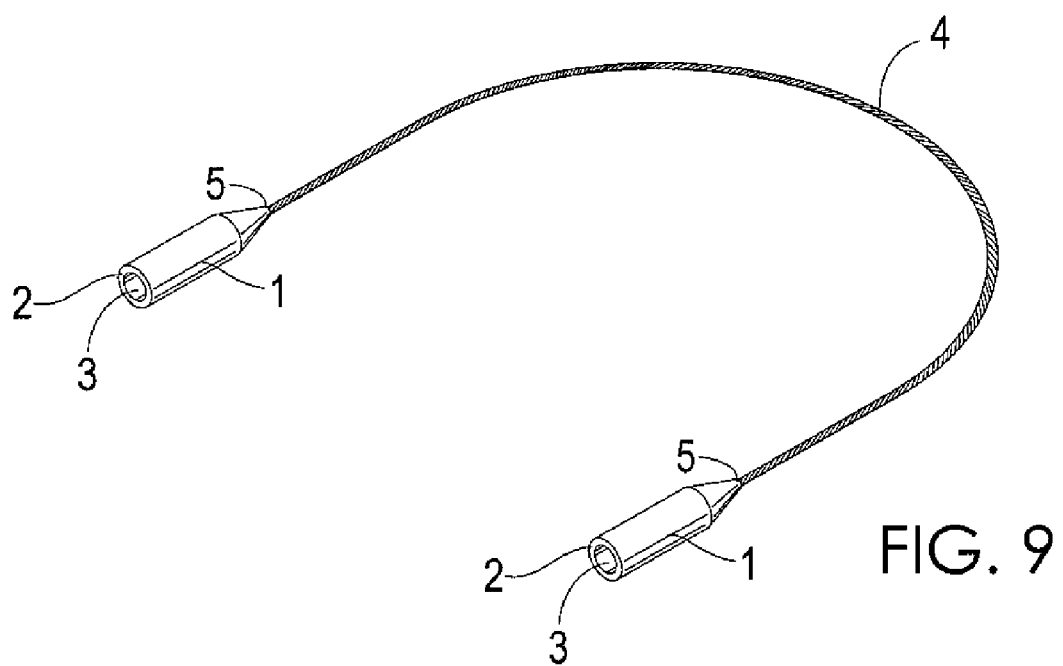
FIG. 9 is a perspective view of an alternate embodiment of the design, showing the connecting cord as a twisted cable.
Figure 10:
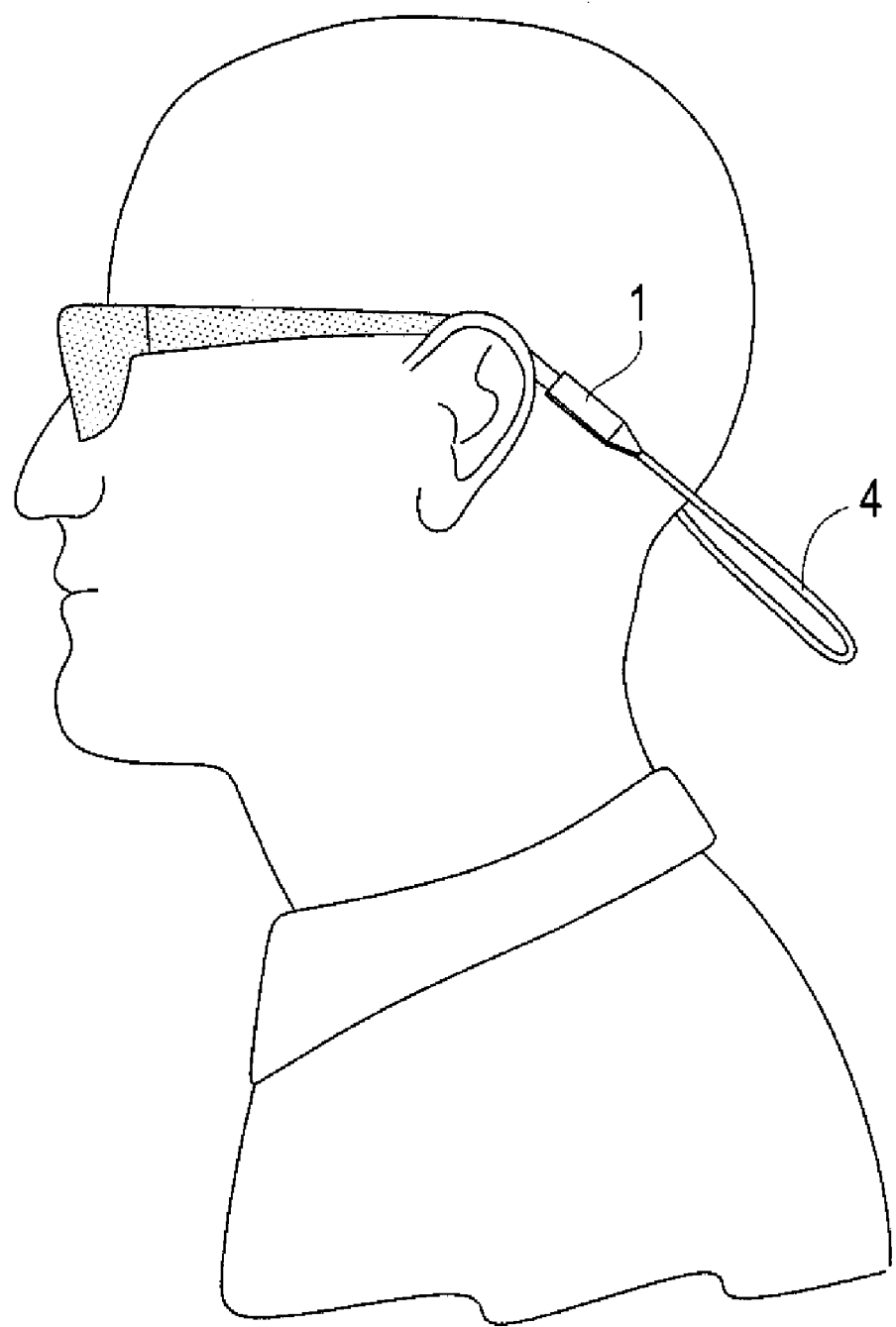
FIG. 10 is a left side view as attached to eyeglass temples and worn over the ears.

In one embodiment, each temple retainer 1 has a first end 2 with an opening 3 which fits tightly over the end of an eyeglass temple which is inserted into the opening 3 in the first end 2, as shown in FIGS. 1-10. The opening 3 in the temple retainer 1 is slightly smaller than the typical end of an eyeglass temple. The dimensions of the opening 3 can be constructed in different sizes, depending on the size of the end of the eyeglass temple desired to be retained. Preferably, each temple retainer 1 is comprised of a substance such as rubber having sufficient elasticity to allow the ends of the eyeglass temples to compress the sides of the opening 3 upon insertion, thus retaining the end of the eyeglass temples with friction. In one embodiment, the cable extends into a second end 5 of the temple retainer 1 where it is secured to the temple retainer in the latter's interior. In other embodiments, the cable 4 can be secured to a second end 5 of the temple retainer, or to any other convenient location on the exterior of the temple retainer. The cable 4 is secured to the temple retainers by means which are known by persons of ordinary skill in the art.

When the eyeglasses are attached to the invention and worn over the ears, the cable 4 has sufficient strength to be suspended in an arc above the wearer's neck, shoulders or garments. As demonstrated by FIG. 10, the cable also hangs from the temples of the glasses and forms an arc not touching the wearer's head, neck or shoulders. The cable can be comprised of any material with enough strength to maintain the suspended arc while being worn over the ears. The cable in one embodiment is a twisted cable and, in other embodiments, is comprised of polymer such as that used in monofilament fishing line or tubing.

What is claimed is:

1. An eyewear retention device comprising:
   a. two temple retainers, each having an opening for receiving an eyeglass temple, and
   b. a cable, each end of the cable being secured to one of the temple retainers, such that when each said opening is attached to the end of an eyeglass temple and the eyeglasses are worn over the ears of a wearer, the cable forms an arc suspended above and not touching the wearer's head, neck or shoulders.

2. The eyewear retention device in claim 1, further comprising the arc formed by the cable being suspended in the air.

* * * * *